June 4, 1940. V. R. TRABUCCO Re. 21,479
MACHINE FOR BENDING WOOD SHEETS
Original Filed July 6, 1937
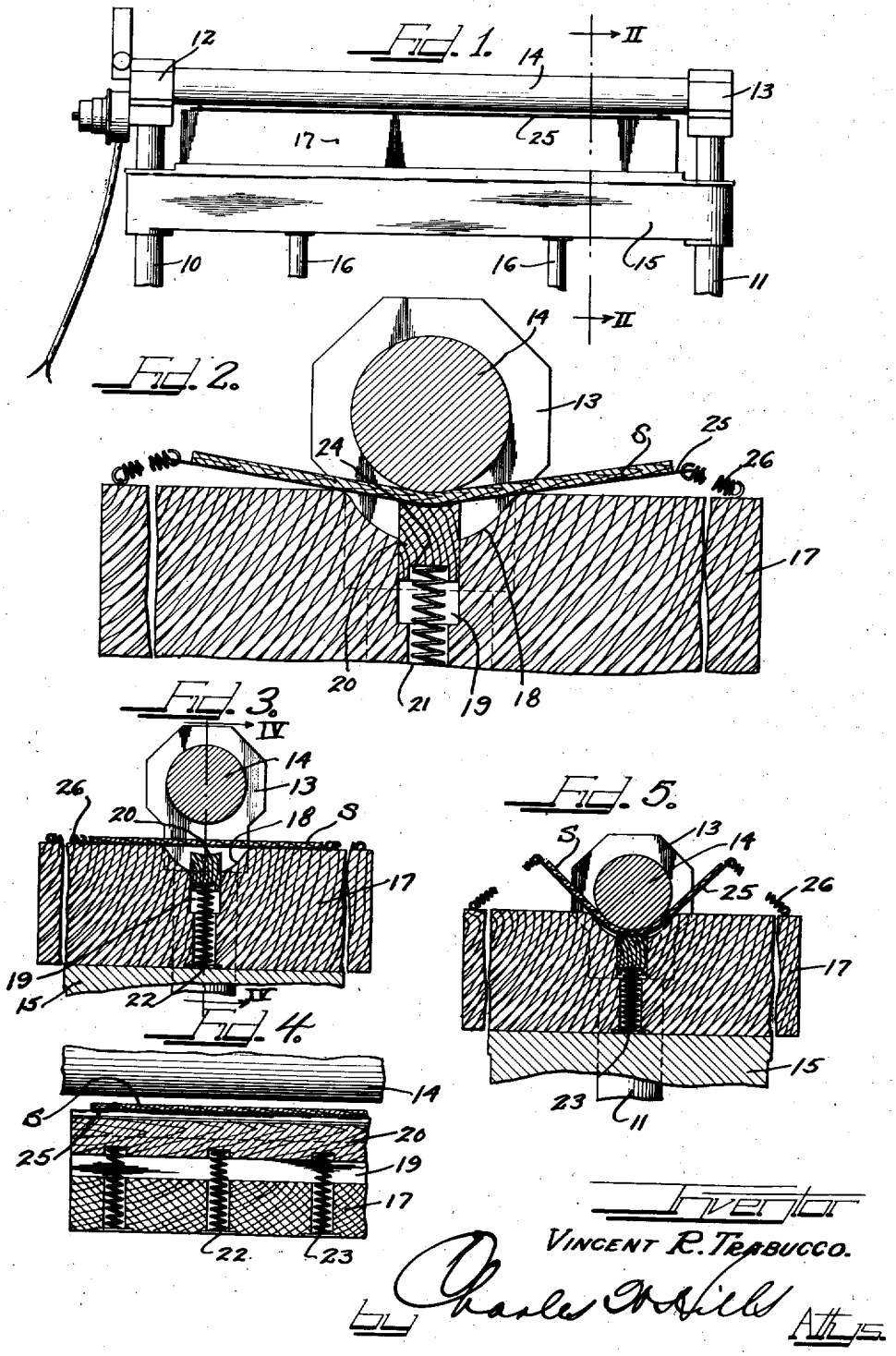

Reissued June 4, 1940

Re. 21,479

UNITED STATES PATENT OFFICE 21,479

MACHINE FOR BENDING WOOD SHEETS

Vincent R. Trabucco, Steger, Ill., assignor to Steger Furniture Mfg. Co., Steger, Ill., a corporation of Illinois Original No. 2,167,428, dated July 25, 1939, Serial No. 151,991, July 6, 1937. Application for reissue January 2, 1940, Serial No. 312,171

3 Claims. (Cl. 144—266)

My invention relates to an improved method and machine for the bending of wood sheets, particularly plywood stock such as is used by manufacturers of radio cabinets or similar structures.

With prior methods and machines, considerable preliminary work was required, including steaming of a sheet along the bend area, and cutting or loosening of plys before the sheet could be safely bent without splitting or splintering. The important object of my invention is to provide a method and a machine which will enable most of such plywood stock to be bent in its natural dry state to thus eliminate time and labor consuming preliminary conditioning steps.

My invention can be readily applied to that type of machine in which a caul block supports a sheet to be bent and is movable toward a heated bending roll, the caul block having a channel into which the sheet is deflected during the bending operation when the caul block and the roll are brought together. In accordance with my invention, pressure is applied against the sheet along the bend area to yieldably force and hold the sheet along the bend area against the bending roll while the sheet is being deflected into the caul block channel, such pressure against the sheet and clamping thereof against the bending roll causing the sheet to accurately follow the curvature of the bending roll and preventing sharp local bending and thus avoiding splitting or splintering.

As a further means to strengthen the sheet and to insure uniform bending thereof around the bending roll, a thin steel plate may be inserted between the sheet and the spring pressed clamping means referred to above, the spring steel plate being held in proper alignment by yieldable means such as coil springs.

The various features of the invention are incorporated in the structure disclosed on the drawing, in which drawing:

Figure 1 is an elevation of the upper part of a bending press to show the platen which supports the caul block, and the heated bending roll;

Figure 2 is an enlarged section on plane II—II of Figure 1 and showing a sheet partially bent;

Figure 3 is a sectional view like Figure 2, on a smaller scale, showing the sheet before bending thereof;

Figure 4 is a section on plane IV—IV of Figure 3; and

Figure 5 is a section similar to Figure 3 showing the final bending operation of the sheet.

Figure 1 shows guide posts 10 and 11 which extend upwardly from the machine base (not shown), these guide posts terminating at their upper ends in heads 12 and 13 between which extends the bending roll 14 which is heated by electrical means or by other suitable means. Below the heads 12 and 13, the guide posts 10 and 11 receive the platen 15 for vertical movement on the posts toward and from the bending roll, bars 16 depending from the platen for operation by pneumatic, hydraulic, or other means (not shown) usually mounted on the machine base and operable to shift the bars for movement of the platen.

The platen supports the caul block 17 which has the longitudinally extending die channel 18 in its upper side for cooperating with the bending roll, the sheet S to be bent being supported on the caul block over the die channel for engagement along a medial portion thereof only by the bending roll and for deflection into the channel for forming of the bend when the platen 15 is powerfully shifted upwardly toward the bending roll.

Below the die channel 18, the caul block 17 has a longitudinally extending rectangular recess 19 for guiding a presser or clamping bar 20, the upper side of the bar being concave to a curvature concentric with the bending roll. Pockets 21 extend downwardly through the caul block from the recess 19 and these pockets are closed at their lower ends by plates 22, these plates forming abutments for the lower ends of coil springs 23 which at their upper ends abut in pockets 24 in the under side of the presser bar 20, the springs tending to hold this bar in upward position with its top surface just below the plane of the top of the caul block, as shown in Figure 3.

I have also shown a thin spring steel plate 25 which is normally held in place against the top of the caul block and over the guide channel as by means of coil springs 26 anchored at their outer ends to the caul block as shown in Figure 2. Said plate 25 is of considerably greater width than the opening or circumferential dimension of the channel 18 so as to bridge the same, as clearly shown in Figures 2 and 5.

Describing now the operation, the platen 15 is normally down away from the bending roll and a sheet S to be bent is laid on the spring steel plate 25 with its bend zone aligned relative to the guide channel 18. As the platen is now forced upwardly, the sheet will encounter the heated bending roll and, as the platen continues, the sheet together with the spring plate will be deflected into the guide channel 18 and will be met by the presser bar 20 which, on account of the upward pressure of the spring 23, will resist deflection of the sheet and the plate and will hold and clamp the sheet and plate along the bend area intimately against the bending roll so that the sheet will remain in contact with the roll and accurately follow the surface thereof so that gradual uniform bending of the sheet results as the bending roll continues into the die channel and any sharp local bending of the sheet, which might result in splitting or splintering, will be prevented. Figure 2 shows the position just after the presser bar 20 becomes active, and Figure 5 shows almost complete deflection of the sheet into the die channel, the final deflection into the channel resulting in slight overbending in order to compenstae for reflex action of the sheet after release from the bending roll so that when the sheet is removed it will have the desired curvature and will maintain such curvature. As shown in Figure 5 the cooperating bending roll 14 and die channel 18 embrace only a medial or intermediate portion of the sheet S, the side margins of said sheet and of the spring plate 25, on opposite sides of said intermediate portion, being free to move away from the caul block on either side of the bending roll.

The springs 26 resist flexure of the steel plate and after withdrawal of the caul block from the bending roll, the springs return the plate to its flat position against the top of the caul block. The sheet plate will assist the presser or clamping bar 20 in assuming uniform accurate bending of the sheet around the bending roll and in distributing the pressure to prevent splitting or splintering. Where the sheets are thinner and more pliable, the steel plate might not be necessary as the presser bar 20 would be able to function alone in cooperation with the bending roll to assure accurate uniformly distributed bending. With the structure shown, single ply as well as multi-ply sheets can be accurately and safely bent without any preliminary treatment or conditioning of the sheet along the bend zone, the heat of the bending roll being sufficient to condition the sheet material for bending thereof. My invention, therefore, eliminates considerable labor and time and materially decreases the cost of bending.

It is evident that my improved method and machine may be efficiently used for bending sheets of other material as, for example, sheets of wood or other fibre, or sheets of composition material.

I have described a practical and efficient embodiment of the features of my invention but I do not desire to be limited to the exact structure and arrangement shown and described as changes and modifications may be made without departing from the scope and spirit of the invention.

I claim as follows:

1. A machine for bending wood sheets comprising a die member, a rigid caul block arranged relatively movable with respect to said die member and having a rigid upper flat surface to support a sheet to be bent, and bounding a depressed surface of said block defining a die channel in spaced opposed relation to said die member, means defining a vertical bore in said block opening into said channel, a pressure receiving member in said channel and reciprocable in said bore, means yieldingly supporting said pressure receiving member, a spring plate normally lying flat on said caul block and bridging said depressed portion of said block, and spring means connected to opposite ends of said plate to subject said opposite ends to tension when said plate is bent by said die member, said plate being a table to support the wood sheets to be bent.

2. A machine for bending wood sheets comprising a convex die member, a caul block movable relative thereto and having a concave channel for receiving said die member, said channel having a longitudinal narrow recess in the bottom thereof, an elongated pressure bar movable in said recess for embracing only a narrow medial portion of said wood sheet, a normally flat spring plate bridging said channel for supporting a sheet to be bent on said caul block, cushioning means yieldably supporting said pressure bar in an outwardly projected position from said recess to hold the wood sheet against said die member and to resist deflection of said plate and sheet as said plate and the wood sheet thereon are bent by relative movement of said die member and caul block into pressure relationship and means preventing displacement of said spring plate from its position bridging said channel when said die member and caul block are moved apart out of pressure relationship.

3. A machine for bending wood sheets comprising a convex die member, a caul block movable relative thereto and having a concave channel for receiving a portion of said die member and a longitudinal recess at the bottom of the channel, a pressure bar movable in said recess, a normally flat spring plate bridging said channel for supporting a sheet to be bent on said caul block, said plate being of greater width than that of the opening of the channel and having side margins extending substantially beyond the side edges of the channel when bent into the channel by the die member, means supporting the pressure bar in said recess and to hold the plate and wood sheet against the die member as said plate and wood sheet thereon are bent by relative movement of said die member and caul block into pressure relationship, said convex die member and said concave channel embracing only intermediate portions of the plate and wood sheet thereon, thus providing clearance on opposite sides of said intermediate portions for the side margins of said plate and sheet so as to enable them to move away from the caul block on both sides of the die member, said side margins of the spring plate supporting the side margins of the sheet beyond the sides of said channel when said intermediate portions of said plate and said sheet are bent into said channel by said die member, and said spring plate cooperating with said pressure bar and its supporting means in the ejection of said bent sheet from said channel upon separation of said die member and caul block.

VINCENT R. TRABUCCO.